US011758227B2

(12) United States Patent
Sullivan et al.

(10) Patent No.: US 11,758,227 B2
(45) Date of Patent: *Sep. 12, 2023

(54) METHODS AND APPARATUS TO CATEGORIZE MEDIA IMPRESSIONS BY AGE

(71) Applicant: The Nielsen Company (US), LLC, New York, NY (US)

(72) Inventors: Jonathan Sullivan, Hurricane, UT (US); Michael Sheppard, Holland, MI (US)

(73) Assignee: The Nielsen Company (US), LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/443,916

(22) Filed: Jul. 28, 2021

(65) Prior Publication Data

US 2021/0360322 A1 Nov. 18, 2021

Related U.S. Application Data

(63) Continuation of application No. 16/827,272, filed on Mar. 23, 2020, now Pat. No. 11,089,369, which is a
(Continued)

(51) Int. Cl.
*H04N 21/466* (2011.01)
*H04N 21/25* (2011.01)
*H04N 21/258* (2011.01)

(52) U.S. Cl.
CPC ....... *H04N 21/4665* (2013.01); *H04N 21/252* (2013.01); *H04N 21/25883* (2013.01); *H04N 21/4667* (2013.01)

(58) Field of Classification Search
CPC ............. H04N 21/4665; H04N 21/252; H04N 21/25883; H04N 21/4667
See application file for complete search history.

(56) References Cited

U.S. PATENT DOCUMENTS 7,328,218 B2 2/2008 Steinberg et al.
8,572,019 B2 10/2013 Eggers et al.
(Continued)

OTHER PUBLICATIONS

United States Patent and Trademark Office, "Notice of Allowance," issued in connection with U.S. Appl. No. 14/928,468, dated Jun. 22, 2016, 10 pages.
United States Patent and Trademark Office, "Non-Final Office Action," issued in connection with U.S. Appl. No. 14/928,468, dated Sep. 30, 2016, 5 pages.
(Continued)

*Primary Examiner* — Oschta I Montoya

(57) ABSTRACT

An example includes splitting audience member records into child nodes based on comparisons of first ones of attribute-value pairs of the audience member records to a first threshold, the attribute-value pairs representative of database subscriber activity data of corresponding audience members; in response to a quantity of ones of the audience member records in a first child node not satisfying the minimum leaf size, storing a terminal node value to indicate the first child node as a terminal node associated with one age category; in response to the quantity of the ones of the audience member records in the first child node satisfying the minimum leaf size, storing an intermediate node value to indicate the first child node as an intermediate node; and generating an age-correction model based on terminal nodes to facilitate correcting a database subscriber age characteristic associated with a media impression that is logged by a server.

13 Claims, 7 Drawing Sheets

Related U.S. Application Data continuation of application No. 16/239,954, filed on Jan. 4, 2019, now Pat. No. 10,602,223, which is a continuation of application No. 15/669,406, filed on Aug. 4, 2017, now Pat. No. 10,200,757, which is a continuation of application No. 14/928,468, filed on Oct. 30, 2015, now abandoned.

(56) References Cited

U.S. PATENT DOCUMENTS

| | | | | |
|---|---|---|---|---|
| 8,909,638 | B2* | 12/2014 | Lin | G16H 50/70 |
| | | | | 177/5 |
| 9,105,053 | B2* | 8/2015 | Cao | G06Q 30/0271 |
| 10,200,757 | B2 | 2/2019 | Sullivan et al. | |
| 10,602,223 | B2 | 3/2020 | Sullivan et al. | |
| 11,089,369 | B2 | 8/2021 | Sullivan et al. | |
| 2005/0106550 | A1* | 5/2005 | Hayashi | G16H 15/00 |
| | | | | 434/362 |
| 2012/0005213 | A1* | 1/2012 | Hannan | G06F 16/24 |
| | | | | 707/741 |
| 2012/0072469 | A1* | 3/2012 | Perez | G06Q 30/0201 |
| | | | | 707/810 |
| 2013/0145022 | A1* | 6/2013 | Srivastava | H04N 21/812 |
| | | | | 709/224 |
| 2016/0191970 | A1* | 6/2016 | Sheppard | G06Q 30/0246 |
| | | | | 725/14 |
| 2017/0006342 | A1* | 1/2017 | Nagaraja Rao | H04N 21/25883 |
| 2017/0127133 | A1 | 5/2017 | Sullivan et al. | |
| 2020/0221178 | A1 | 7/2020 | Sullivan et al. | |

OTHER PUBLICATIONS

United States Patent and Trademark Office, "Final Office Action," issued in connection with U.S. Appl. No. 14/928,468, dated May 8, 2017, 6 pages.

United States Patent and Trademark Office, "Notice of Allowance," issued in connection with U.S. Appl. No. 15/669,406, dated Nov. 26, 2018, 7 pages.

United States Patent and Trademark Office, "Final Office action," issued in connection with U.S. Appl. No. 15/669,406, dated Apr. 19, 2018, 7 pages.

United States Patent and Trademark Office, "Non-Final Office action," issued in connection with U.S. Appl. No. 15/669,406, dated Dec. 21, 2017, 6 pages.

United States Patent and Trademark Office, "Notice of Panel Decision from Pre-Appeal Brief Review," issued in connection with U.S. Appl. No. 15/669,406, dated Sep. 14, 2018, 2 pages.

United States Patent and Trademark Office, "Non-Final Office Action," issued in connection with U.S. Appl. No. 16/239,954, dated Jul. 18, 2019, 5 pages.

United States Patent and Trademark Office, "Notice of Allowance," issued in connection with U.S. Appl. No. 16/239,954, dated Nov. 1, 2019, 7 pages.

United States Patent and Trademark Office, "Non-Final Office Action," issued in connection with U.S. Appl. No. 16/827,272, dated Sep. 30, 2020, 7 pages.

United States Patent and Trademark Office, "Notice of Allowance," issued in connection with U.S. Appl. No. 16/827,272, dated Apr. 2, 2021, 7 pages.

* cited by examiner

| | ATTRIBUTE | VALUE |
|---|---|---|
| AME | TRUE AGE | 36 |
| DATABASE PROPRIETOR | NUMBER OF CONNECTIONS | 103 |
| | LOGIN FREQUENCY (PER WEEK) | 4 |
| | PRIMARY LOGIN DEVICE | ANDROID TABLET |
| | MEDIAN AGE OF CONNECTIONS | 27 |
| | STATED AGE | 35 |
| | YEAR OF HS GRADUATION | 1997 |
| | POST FREQUENCY (PER WEEK) | 1 |

FIG. 2

METHODS AND APPARATUS TO CATEGORIZE MEDIA IMPRESSIONS BY AGE

CROSS REFERENCE TO RELATED APPLICATIONS

This patent arises from a continuation of U.S. patent application Ser. No. 16/827,272, filed on Mar. 23, 2020, which is a continuation of U.S. patent application Ser. No. 16/239,954, filed on Jan. 4, 2019, now U.S. Pat. No. 10,602,223, which is a continuation of U.S. patent application Ser. No. 15/669,406, filed on Aug. 4, 2017, now U.S. Pat. No. 10,200,757, which is a continuation of U.S. patent application Ser. No. 14/928,468, filed Oct. 30, 2015. U.S. patent application Ser. No. 16/827,272, U.S. patent application Ser. No. 16/239,954, U.S. patent application Ser. No. 15/669,406, and U.S. patent application Ser. No. 14/928,468 are hereby incorporated herein by reference in their entireties. Priority to U.S. patent application Ser. No. 16/827,272, U.S. patent application Ser. No. 16/239,954, U.S. patent application Ser. No. 15/669,406, and U.S. patent application Ser. No. 14/928,468 is claimed.

FIELD OF THE DISCLOSURE

This disclosure relates generally to audience membership, and, more particularly, to methods and apparatus to categorize media impressions by age.

BACKGROUND

Audience measurement entities measure exposure of audiences to media such as television, music, movies, radio, Internet websites, streaming media, etc. The audience measurement entities generate ratings based on the measured exposure. Ratings are used by advertisers and/or marketers to purchase advertising space and/or design advertising campaigns. Additionally, media producers and/or distributors use the ratings to determine how to set prices for advertising space and/or to make programming decisions.

Techniques for monitoring user access media have evolved significantly over the years. Some prior systems perform such monitoring primarily through server logs. In particular, entities serving media on the Internet can use such prior systems to log the number of requests received for their media at their server.

BRIEF DESCRIPTION OF THE DRAWINGS

FIG. 2 illustrates an example audience member record used by the age modeler of FIG. 1 to generate the age correction model.

Wherever possible, the same reference numbers will be used throughout the drawing(s) and accompanying written description to refer to the same or like parts.

DETAILED DESCRIPTION

Figure 1:
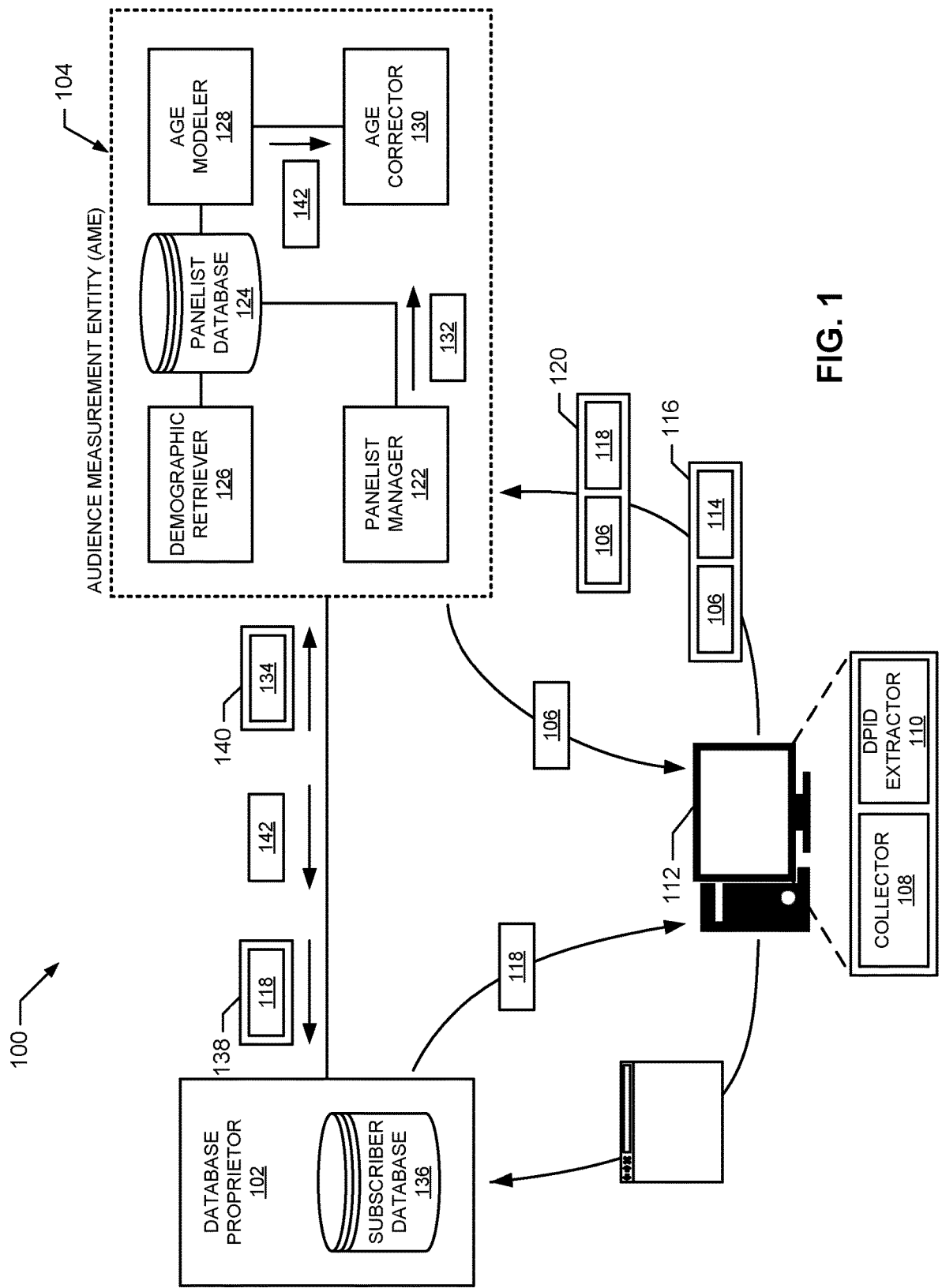
FIG. 1 illustrates an example system constructed in accordance with the teachings of this disclosure.

Examples disclosed herein may be used to generate age correction models that correct age misattribution in impression records. To measure audiences, an audience measurement entity (AME) may use instructions (e.g., Java, java script, or any other computer language or script) embedded in media to collect information indicating when audience members are accessing media on a computing device (e.g., a computer, a laptop, a smartphone, a tablet, etc.). Media to be monitored is tagged with these instructions. When a device requests the media, both the media and the instructions are downloaded to the client. The instructions cause information about the media access to be sent from the device to a monitoring entity (e.g., the AME) and/or a database proprietor (e.g., Google, Facebook, Experian, Baidu, Tencent, etc.). Examples of tagging media and monitoring media through these instructions are disclosed in U.S. Pat. No. 6,108,637, issued Aug. 22, 2000, entitled "Content Display Monitor," which is incorporated by reference in its entirety herein.

Additionally, the instructions cause one or more user and/or device identifiers (e.g., an international mobile equipment identity (IMEI), a mobile equipment identifier (MEID), a media access control (MAC) address, an app store identifier, an open source unique device identifier (OpenUDID), an open device identification number (ODIN), a login identifier, a username, an email address, user agent data, third-party service identifiers, web storage data, document object model (DOM) storage data, local shared objects also referred to as "Flash cookies"), browser cookies, an automobile vehicle identification number (VIN), etc.) located on the computing device to be sent to a partnered database proprietor to identify demographic information (e.g., age, gender, geographic location, race, income level, education level, religion, etc.) for the audience member of the computing device collected via a user registration process. For example, an audience member may be viewing an episode of "Documentary Now" in a media streaming app on a smartphone. In that instance, in response to instructions executing within the app, a user/device identifier stored on the smartphone is sent to the AME and/or a partner database proprietor to associate the instance of media exposure (e.g., an impression) to corresponding demographic information of the audience member. The database proprietor can then send logged demographic impression data to the AME for use by the AME in generating, for example, media ratings and/or other audience measures.

In some examples, the partner database proprietor does not provide individualized demographic information (e.g., user-level demographics) in association with logged impressions. Instead, in some examples, the partnered database proprietor provides aggregate demographic impression data (sometimes referred to herein as "aggregate census data"). For example, the aggregate demographic impression data provided by the partner database proprietor may show that fifteen thousand males age 18-23 watched the episode of "Documentary Now" in the last seven days via computing devices. However, the aggregate demographic information from the partner database proprietor does not identify individual persons (e.g., is not user-level data) associated with individual impressions. In this manner, the database proprietor protects the privacies of its subscribers/users by not revealing their identities and, thus, user-level media access activities, to the AME.

The AME uses this aggregated demographic information to calculate ratings and/or other audience measures for corresponding media. However, during the process of registering with the database proprietor, a subscriber may lie or may otherwise provide inaccurate demographic information. For example, during registration, the subscriber may provide an inaccurate age or location. These inaccuracies cause errors in the aggregate demographic information from the partner database proprietor, and can lead to errors in audience measurement. To combat these errors, the AME recruits panelist households that consent to monitoring of their exposure to media. During the recruitment process, the AME obtains detailed demographic information from the members of the panelist household. While the self-reported demographic information (e.g., age, etc.) reported to the database proprietor is generally considered to be potentially inaccurate, the demographic information collected from the panelist (e.g., via a survey, etc.) by the AME is considered highly accurate. As used herein, the term "true age" refers to age information collected from the panelist by the AME.

The AME also retrieves activity data from the partnered database proprietor. The database proprietor activity data includes self-reported demographic data (e.g., age, high school graduation year, profession, marital status, etc.), subscriber metadata (e.g., number of connections, median age of connections, etc.), and subscriber use data (e.g., frequency of login, frequency of posts, devices used to login, privacy settings, etc.). Examples of retrieving the activity data from the partnered database subscriber(s) are disclosed in U.S. patent application Ser. No. 14/864,300, filed Sep. 24, 2015, entitled "Methods and Apparatus to Assign Demographic Information to Panelists," which is incorporated by reference in its entirety herein.

The AME develops age correction model(s) (e.g., decision tree models, regression tree models, etc.) to assign an age category (e.g., an age-based demographic bucket) and/or an age category probability density function (PDF) to an audience member corresponding to a logged impression. The PDFs indicate probabilities that the audience member falls within certain ones of the respective age categories. The age correction models are generated using the database proprietor activity data of panelists and the detailed demographic information supplied by the panelist to the AME. The database proprietor activity data is organized into attribute-value pairs. In the attribute-value pairs, the attribute is a category in the activity data (e.g., marital status, post frequency, reported age, etc.) and the value is the corresponding value (e.g., single, five times per week, twenty seven, etc.) of the attribute. For example, an attribute-value pair may be [active_in_last_7_days, true].

In some examples, to generate the model, one of the attributes is selected with a corresponding threshold value. For example, the selected attribute-threshold pair may be [login_frequency, three times per week]. The audience member records are split into two portions based on the attribute-threshold pair. For example, the audience member records may be divided between the audience members records corresponding to login frequencies of greater than three times per week and the audience members records corresponding to login frequencies of less than or equal to three times per week. Child nodes are created with each portion of the audience member records. For example, a child node is created for the audience members records corresponding to login frequencies of greater than three times per week, and a child node is created for the audience members records corresponding to login frequencies of less than or equal to three times per week. For each child node, a determination is made, based on a minimum leaf size, whether (i) to designate the child node as an intermediate node and to split audience member records assigned to the intermediate node into additional child nodes, or (ii) to designate the child node as a terminal node. In some examples, the child node is designated a terminal node if the audience member records assigned to the child node are associate with the same age category. This process continues until there are no child nodes, all audience members in a child node are in the same age category, or the model satisfies (e.g., is greater than) a length threshold. The terminal nodes are assigned age categories or age-category probability density functions based on the true ages of audience members assigned to that terminal node.

As disclosed below, before generating the age correction model, the audience member records in the training data set sorted into age categories (sometimes referred to as "age-based demographic groups" and/or "demographic buckets"). For example, age categories may be defined for ages 7-12, 13-17, 18-24, 25-34, 35-44, 45-54, 55-64, and 65+. Traditionally, because of the difficulty of recruiting panelists in certain age categories (e.g., the 7-12 age category, the 55-64 age category, the 65+ age category, etc.), some age categories are underrepresented by the audience member records in the training set. Underrepresented age categories may not contribute to the model enough so that output of the model is influenced by the underrepresented age categories.

As disclosed below, before generating the age correction model, the audience member records in the training set are assigned weights based on their corresponding age category. The example assigned weight for the audience member records in one of the age categories is inversely proportional to a quantity of the audience member records in a corresponding one of the age categories. In some examples, the age categories with a quantity of the audience member records in the training data set that satisfy (e.g., greater than or equal to) a first weighing threshold are assigned a neutral weight. In some such examples, the neutral weight is one. In some examples, the age categories with the quantity of the audience member records that satisfy (e.g., are less than or equal to) a second weighing threshold are assigned a maximum weight. In some such examples, the maximum weight is between 1.1 and 1.5. In some examples, the age categories with the quantity of the audience member records that is between the first weighing threshold and the second weighing threshold are assigned a weight between the neutral weight and the maximum weight.

In the disclosed examples, while generating the age correction model, when determining whether to split a child node, the weights for the audience member records assigned to the child node are added together and compared to the minimum leaf size. If the summed weights satisfy (e.g., greater than) the minimum leaf size, the child node is split into more child nodes based on another attribute-threshold pair. Otherwise, if the summed weights do not satisfy (e.g., less than or equal to) the minimum leaf size, the child node becomes a terminal node. The minimum leaf size is determined based on the number of audience member records in the training set. The minimum leaf size is chosen to prevent both overfitting, which causes the terminal nodes to be too specific, and underfitting, which causes the terminal nodes to be too general.

When the branches of the age correction model terminate in terminal nodes, the probability density functions assigned to the terminal nodes are characterized. For example, a terminal node may be associated audience member records from the second training set corresponding to twenty-five audience member records associated with the 18-24 age category, fifty-seven audience member records associated with the 25-34 age category, and eighteen audience member records associated with the 35-44 age category. Examples to characterize the probability density functions assigned to the terminal nodes based on associated audience member records associated with the terminal nodes are disclosed in U.S. Pat. No. 9,092,797, issued Jul. 28, 2015, entitled "Methods and Apparatus to Analyze and Adjust Demographic Information," which is incorporated by reference in its entirety.

The model is used to correct inaccurate age information provided by the subscribers of the database proprietor. When an impression is logged for a subscriber of the database proprietor, the activity data associated with that subscriber is processed by the model to assign a corrected age value and/or a probability density function to the impression based on which of the terminal nodes the activity data is assigned. Examples to assign a corrected age value and/or a probability density function to the impression based on the model are disclosed in U.S. patent application Ser. No. 14/604,394, filed Jan. 23, 2015, entitled "Methods and Apparatus to Correct Age Misattribution in Media Impressions," which is incorporated by reference in its entirety.

FIG. 1 illustrates an example system 100 to generate an age correction model used to be used to correct age information associated with demographic impressions logged by a database proprietor 102. In the illustrated example, the AME 104 provides an AME identifier (AME ID) 106, a collector 108, and a database proprietor identifier (DPID) extractor 110 to a computing device 112 (e.g., a desktop, a laptop, a tablet, a smartphone, etc.) associated with a panelist household. For example, the AME 104 may provide the collector 108, the DPID extractor 110, and the AME ID 106 via a registration website. In some examples, the collector 108, the DPID extractor 110 are performed by instructions (e.g., Java, java script, or any other computer language or script) embedded in the registration website, or any other suitable website. In some examples, the AME ID 106 is a cookie or is encapsulated in a cookie set in the computing device 112 by the AME 104. Alternatively, the AME ID 106 could be any other user and/or device identifier (e.g., an email address, a user name, etc.). In any case, the example AME ID 106 is an alphanumeric value that the AME 104 uses to uniquely identify the panelist household.

In the illustrated example, member(s) of the panelist household (e.g. a head of household) provide(s) detailed demographic information 114 (e.g., true age, ethnicity, first name, middle name, gender, household income, employment status, occupation, rental status, level of education, etc.) of the member(s) of the panelist household. In the illustrated example, the detailed demographic information 114 is provided via the computing device 112 through the registration website, or any other suitable website. The example computer device 112 sends an example registration message 116 that includes the AME ID 106 and the detailed demographic information 114. Alternatively, in some examples, AME 104 collects the detailed demographic information 114 though other suitable means, such as a telephone survey, a paper survey, or an in-person survey, etc.

In the illustrated example, when a member of the panelist household uses the computing device 112 to visit a website and/or use an app associated with a database proprietor 102, the database proprietor 102 sets or otherwise provides, on the computing device 112, a panelist DPID 118 associated with subscriber credentials (e.g., user name and password, etc.) used to access the website and/or the app. In some examples, the panelist DPID 118 is a cookie or is encapsulated in a cookie. Alternatively, the panelist DPID 118 could be any other user and/or device identifier. The example DPID extractor 110 extracts the DPID 118 (e.g., from a cookie, etc.). The example collector 108 collects the panelist DPIDs 118 on the computing device 112 and sends an example ID message 120 to the example AME 104. In the illustrated example, the ID message 120 includes the extracted panelist DPID 118 and the AME ID 106 corresponding to the panelist household. In some examples, the DPID extractor 110 remembers the panelist DPIDs 118 that have been extracted and sends the ID message 120 when a new panelist DPID 118 has been extracted.

In the illustrated example, the AME 104 includes an example panelist manager 122, an example panelist database 124, an example demographic retriever 126, an example age modeler 128, and an example age corrector 130. The example panelist manager 122 receives the registration message 116 and the ID message(s) 120 from the computing device 112. Based on the registration message 116 and the ID message(s) 120, the panelist manager 122 generates a panelist household record 132 that associates the AME ID 106 to the detailed demographic information 114 and the DPID(s) 118 of the members of the panelist household. The example panelist manager 122 stores the example panelist household record 132 in the panelist database 124.

The example demographic retriever 126 is structured to retrieve database proprietor activity data 134 from the example database proprietor 102. In the illustrated example, the database proprietor 102 provides an application program interface (API) that provides access to a subscriber database 136 based on DPIDs (e.g., the panelist DPIDs 118, etc.). The example subscriber database 136 includes the database proprietor activity data 134 of the subscribers to the database proprietor 102. The example demographic retriever 126 sends queries 138 to the database proprietor 102 that include the DPIDs 118 associated with the example panelist household records 132 in the example panelist database 124. In the illustrated example, in response to the queries 138, the database proprietor 102 sends query responses 140 to the AME 106. The example query responses 140 includes the database proprietor activity data 134 corresponding to the panelist DPID 118 of the example query 138. The example demographic retriever 126 stores the database proprietor activity data 134 in association with the corresponding panelist household record 132 in the panelist database 124.

The example age modeler 128 generates an example age correction model 142 based on the panelist household records 132 in the example panelist database 124. Examples for generating the age correction model 142 are disclosed below in connection with FIG. 2. To generate the age correction model 142, the age modeler 128 splits the panelist household records 132 into audience member records that each represent a member of one of the panelist households. For example, a panelist household may have four members (e.g., a father, a mother, a son, and a daughter, etc.). In such an example, the age modeler 128 creates four audience member records, with each of the audience member records including a portion of the detailed demographic data 114 and the database proprietor activity data 134 corresponding to the respective member of the panelist household.

The example age modeler 128 separates the audience member records into a training set and a validation set. In some examples, 80% of the audience member records are assigned to the training set, and the remaining 20% of the audience member records are assigned to the validation set. In some such examples, the multiple training sets and multiple validation sets are generated. In some example, the audience member record are randomly or pseudo-randomly assigned to either the training set or the validation set. The example age modeler 128 assigns weights (w) to the audience member records in the training set. Initially, the audience member records in the training set are divided in to age categories (e.g., ages 7-13, ages 14-17, ages 18-21, etc.) based on the true ages associated with the audience member records. The weight assigned to audience member records in one of the age categories is based on a quantity ($n_g$) of audience member records in that age category. The example age modeler 128 then generates the age correction model 142 based on decision tree generation techniques or regression tree generation techniques using the weighted audience member records.

In some examples, when the AME 104 has access to database subscriber activity data 134 associated with individualized logged impressions, the age corrector 130 receives the age correction model 142 from the age modeler 128. In some such examples, the example age corrector 130 uses the age correction model 142 to assign an age-based PDF to the individualized logged impression. The age-based PDF defines probabilities that the real age of the subscriber corresponding to the logged impression is within certain age categories. For example, the age-based PDF may indicate that the probability of the subscriber associated with the logged impression being in the 18-21 age range is 11.6%, the probability of the subscriber being in the 22-27 age range is 44.5%, the probability of the subscriber being in the 28-33 age range is 36.7%, and the probability of the subscriber being in the 34-40 age range is 7.2%.

Alternatively, in some examples, the AME 104 sends the age correction model 142 to the database proprietor 102. In some such examples, when the database proprietor 102 logs an impression associated with a subscriber, the database proprietor 102 uses the age correction model 142 to assign the age based PDF to the logged impression. In some such examples, because the age based PDFs are fixed through the generation of the age correction model 142, the database proprietor 102 assigns a PDF identifier that identifies a particular age based PDF to the logged impression. In some such examples, the database proprietor 102 aggregates the logged impressions based on the PDF identifier. For example, the aggregate logged impression data from the database proprietor 102 may indicate that two thousand subscribers assigned to the "MT" age-based PDF watched season five, episode two of "Portlandia" in the last seven days. In such an example, the "M7" age-based PDF may correspond to probability of the subscribers associated with the aggregate logged impression data being in the 18-21 age category is 3.2%, the probability of the subscribers being in the 22-27 age category is 86.9%, the probability of the subscribers being in the 28-33 age category is 9.4%, and the probability of the subscribers being in the 34-40 age category is 0.5%. In such an example, of the two thousand subscribers, the AME 104 would assign 64 subscribers to the 18-21 age category, 1738 subscribers to the 22-27 age category, 188 subscribers to the 28-33 age category, and 10 subscribers to the 34-40 age category.

FIG. 2 illustrates an example audience member record 202 generated by the age modeler 128 of FIG. 1 to produce the age correction model 142. The example age modeler 128 generates the example audience member record 202 based the on detail demographic data 114 (FIG. 1) retrieved from the computing device 112 of a panelist, and the database proprietor subscriber activity data 134 retrieved from the database proprietor 102 (FIG. 1). The audience member record 202 corresponds to a member of a panelist household. For example, if a panelist household has three members, three audience member records 202 are generated for that panelist household. In the illustrated example, the audience member record 202 includes pairs of attributes 204 and values 206. The example attributes 204 include data categories that are collected by the example database proprietor 102 and/or the example AME 104 (FIG. 1). A first portion 208 of the attributes 204 and the corresponding values 206 is derived from the detail demographic data 114. For example, a pair of an attribute 204 and a value 206 that is derived from the detail demographic data 114 may be "true age" and "36," respectively. A second portion 210 of the attributes 204 and the corresponding values 206 is derived from the database proprietor subscriber activity data 134 associated with the member of the panelist household. For example, a pair of an attribute 204 and a value 206 that is derived from database proprietor subscriber activity data 134 may be "stated age" and "35," respectively.

Figure 3:
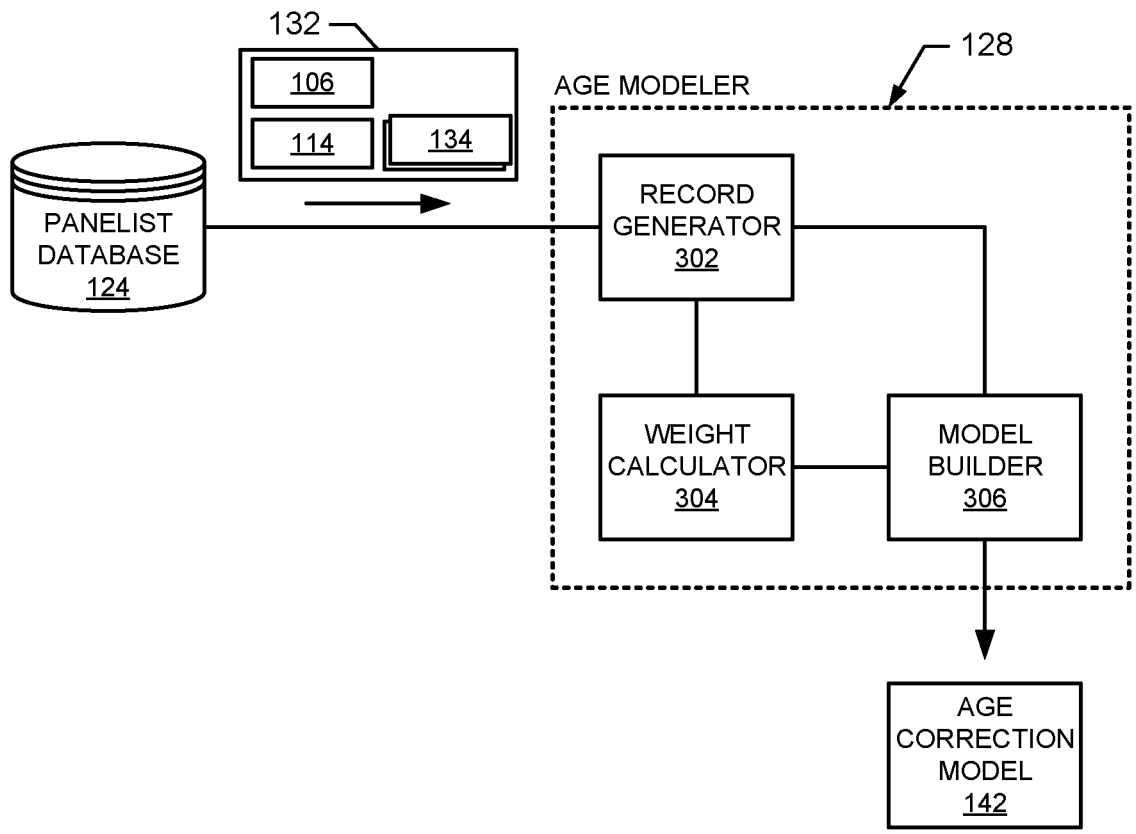
FIG. 3 illustrates an implementation of the example age modeler of FIG. 1 to generate the age correction model.

FIG. 3 illustrates an implementation of the example age modeler 128 of FIG. 1 to generate the age correction model 142. The example age modeler 128 includes an example record generator 302, an example weight calculator 304, and an example model builder 306. The example age modeler 128 is structured to generate an age correction model 142 that compensates for underrepresented age categories from within the members of the panelist households.

In the illustrated example, the record generator 302 generates the audience member records 202 (FIG. 2) based on the panelist household records 132 in the panelist database 124. To generate the audience member records 202, the example record generator 302 retrieves the panelist household records 132 from the panelist database 124. The example panelist household record 132 includes the AME ID 106 corresponding to the panelist households, the detailed demographic information 114, and one or more sets of database subscriber activity data 134 (e.g., a set of database subscriber activity data 134 for each member of the panelist household). The example record generator 302 randomly or pseudo-randomly divides the generated audience member records 202 into a training set and a validation set.

The example weight calculator 304 receives or otherwise retrieves the training set from the example record generator 302. The weight calculator 304 sorts the audience records in the training set into age categories based on the true ages. To determine the weights assigned to the audience member records 202, the example weight calculator 304 categorizes the age categories based on a quantity ($n_g$) of the audience member records 202 in the respective age categories. Alternatively, in some examples (e.g., when regression analysis is used), to determine the weights assigned to one of the audience member records 202, the example weight calculator 304 calculates the quantity ($n_g$) of the audience member records 202 based on the true age of the one of the audience member records 202 and other ones of the audience member records 202 within a target error level ($e_t$) of that true age. For example, if the true age associated with the audience member record 202 is 42 years old and the target error level ($e_t$) is two years, the quantity ($n_g$) of the audience member records 202 is calculated with audience member records 202 with true ages that range from 40-44 years old.

Additionally, the example weight calculator 304 determines the first weighing threshold ($th_n$) and the second weighing threshold ($th_{vl}$). The example weight calculator 304 calculates the first weighing threshold ($th_n$) using Equation 1 below.

$$th_n = m_{ls} * c \qquad \text{Equation 1}$$

In Equation 1 above, $m_{ls}$ is the minimum leaf size, and c is a constant. In some examples c is equal to a value between 1.1 and 1.5. The value of c is configurable. A larger value of c increases the number of age categories that are considered to be underrepresented and increases the weight assigned to underrepresented age categories. For example, if the minimum leaf size ($m_{ls}$) is 30 audience member records 202 and the constant (c) is 1.2, the first weighing threshold is 36 (30*1.2). In such an example, if one of the age categories has 36 or less associated audience member records, the one of the age categories is considered to be underrepresented. The example weight calculator 304 calculates a second weighing threshold ($th_{vl}$) using Equation 2 below.

$$th_{vl} = \frac{m_{ls} * c}{w_{max}} \qquad \text{Equation 2}$$

In Equation 2 above, $w_{max}$ is a maximum weight to assign to the age categories. Changing the example maximum weight ($w_{max}$) changes the influence that underrepresented age categories have on the age correction model 142. For example, if the minimum leaf size ($m_{ls}$) is 30 audience member records 202, the constant (c) is 1.2, and the maximum weight ($w_{max}$) is 2, the second weighing threshold is 18 (30*1.2/2).

The example weight calculator 304 compares the quantities ($n_g$) of the audience member records 202 in the respective age categories to the first and second weighing thresholds. In the illustrative example, if the quantity ($n_g$) of the audience member records 202 in the age category of interest satisfies (e.g. is greater than or equal to) the first weighing threshold ($th_n$), the weight calculator 304 assigns a neutral weight (e.g., one) to the audience member records 202 in that age category. For example, if there are 353 audience member records 202 in the 45-49 age category and the first weighing threshold ($th_n$) is 36, the weight calculator 304 assigns the neutral weight to the respective 353 audience member records 202. If the quantity ($n_g$) of the audience member records 202 in the age category satisfies (e.g., is less than or equal to) the second weighing threshold ($th_{vl}$), the weight calculator assigns the maximum weight ($w_{max}$) to the audience member records 202 in that age category. For example, if there are 10 audience member records 202 in the 7-13 age category and the second weighing threshold ($th_{vl}$) is 18, the weight calculator 304 assigns the maximum weight ($w_{max}$) to the respective 10 audience member records 202.

If the quantity ($n_g$) of the audience member records 202 in the age category of interest does not satisfy either of the first weighing threshold ($th_n$) or the second weighing threshold ($th_{vl}$), the weight calculator 304 assigns a weight to the audience member records 202 in the age category using Equation 3 below.

$$w = \frac{m_{ls} * c}{n_g} \qquad \text{Equation 3}$$

In Equation 3 above, w is the weight to be assigned to the audience member records 202 in the particular age category. For example, if the first weighing threshold ($th_n$) is 36, the second weighing threshold ($th_{vl}$) is 18, and the quantity ($n_g$) of the audience member records 202 in the age category is 28, the weight calculator 304 assigns a weight (w) of 1.3 (30*1.2/28) to the respective 28 audience member records 202.

The example model builder 306 receives or otherwise retrieves the weighted audience member records 202 from the weight calculator 304. The example model builder 306 uses the weighted audience member records 202 to generate a decision tree or a regression tree. Initially, to generate the age correction model 142, the model builder 306 selects an attribute (e.g., one of the attributes 204 of FIG. 2) and a corresponding value threshold. In some examples, the model builder 306 selects the attribute 204 and the corresponding value threshold based on (i) maximizing entropy and, (ii) for each of the age categories, maximizing an average homogeneity of the audience member records assigned to the child nodes. A minimum entropy (e.g., 0.0) means that all the audience member records would be assigned to the same child node based on the selected attribute 204 and the corresponding value threshold. A maximum entropy (e.g., 1.0) means that 50% of the audience member records would be assigned to one of the child nodes and 50% of the audience member records would assigned to the other one of the child nodes. A minimum homogeneity for the age categories means that 50% the audience member records associated with the age category are assigned of one of the child nodes, and 50% of the audience member records associated with the age category are assigned to the other one of the child nodes. A maximum homogeneity means that all of the audience member records associated with an age category are assigned to the same child node.

The example model builder 306 generates two child nodes. The example model builder 306 assigns the audience member records 202 that satisfy (e.g., are greater than or equal to) the selected value threshold to one of the child nodes. Additionally, the example model builder 206 assigns the audience member records 202 that don't satisfy (e.g. are less than) the selected value threshold to the other one of the child nodes. For example, the selected attribute 204 is "number of connections" and the value threshold is 215, the audience member records 202 with a value (e.g., the value 206 of FIG. 2) associated with the "number of connections" attribute 204 greater than or equal to 215 is assigned to one of the child nodes.

Subsequently, the model builder 306 analyzes the child nodes until there are no more child nodes to be analyzed. To start analyzing a child node, the example model builder 306 determines whether the child node is to be (i) designated as an intermedia node and split into two additional child nodes, or (ii) designated as a terminal node. To determine whether the child node is to be designated as an intermedia node and split into two additional child nodes, the example model builder 306 determines an effective quantity ($n_e$) of the audience member records 202 at the child node using Equation 4 below.

$$n_e = \sum_{i=1}^{j} rw_i \qquad \text{Equation 4}$$

In Equation 4 above, j is the quantity of the audience member records 202 assigned to the child node being analyzed, and $rw_i$ is the assigned weight of the ith audience member record 202. An example of audience member records 202 assigned to a child node is shown on Table 1 below.

TABLE 1

EXAMPLE AUDIENCE MEMBER RECORDS WITH ASSOCIATED WEIGHTS

| Number of Audience Member Record(s) | Weight |
|---|---|
| 1-35 | 1 |
| 36-42 | 1.3 |
| 43-49 | 1.6 |
| 50 | 1.8 |
| 51, 52 | 2 |

In the example shown on Table 1 above, the effective quantity ($n_e$) of audience member records 202 is 61.1 ((35*1)+(7*1.3)+(7*1.6)+(1*1.8)+(2*2)).

In the illustrated example of FIG. 3, the model builder 306 determines that the child node is to be designated an intermediate node and split into two additional child nodes if the effective quantity ($n_e$) of the audience member records 202 satisfies Equation 5 below.

$$n_e > 2*m_{ls} \qquad \text{Equation 5}$$

For example, if the effective quantity ($n_e$) of the audience member records 202 is 61.1 and the minimum leaf size ($m_{ls}$) is 30, the model builder 306 determines to split the child node into two additional child nodes (61.1>2*30). To split the child node into additional child nodes, the example model builder 206 selects an attribute 204 and a value threshold (e.g. based on a maximum entropy value) and assigns the audience member records 202 to the respective new child nodes based on the selected attribute 204 and the selected value threshold. When the child nodes have been analyzed (e.g., each branch of the tree ends in a terminal node), the model builder 306 designates the decision tree or the regression tree to be the age-correction model 142.

The example model builder 306 receives or otherwise retrieves the validation set from the record generator 302. The model builder 306 applies the audience member records 202 in the validation set to the age-correction model 142 so that the audience member records 202 are assigned to the respective terminal nodes. After the audience member records 202 are assigned to the respective terminal nodes, the model builder 306 determines an accuracy of the age correction model 142. In some examples, the accuracy is based on comparing the audience member records 202 of the validation set assigned to the terminal node to the age-based PDF corresponding to the terminal node. An example to determine the accuracy of one of the terminal nodes is shown in Table 2 below.

TABLE 2

EXAMPLE AGE-BASED PDF FOR A TERMINAL NODE AND EXAMPLE AUDIENCE MEMBER RECORDS ASSIGNED TO THE TERMINAL NODE

| Age Category | 7-13 | 14-21 | 22-34 | 35-44 | 45-64 | 65+ |
|---|---|---|---|---|---|---|
| Age-Based PDF (Predicted True Age) | 0% | 5% | 15% | 70% | 10% | 0% |
| Validation Set (Actual True Age) | 0% | 10% | 23% | 57% | 8% | 2% |

In Table 2 above, 15% of the audience member records 202 in the validation set are not classified correctly by the age-correction model 142. For example, according to the age-based PDF, 5% of the audience member records 202 assigned to the particular terminal node are to be classified in the 14-21 age category. However, in the example, 10% of the audience member records 202 with a true age between 14 and 21 are assigned to the terminal node by the age-correction model 142. In some examples, the accuracy of the age-correction model 142 is determined by calculating a maximum error, a mean error and/or a mode error for the terminal nodes in the age-correction model 142. In some examples, if the maximum error, the mean error and/or the mode error is/are too large, the model builder 306 regenerates the age-correction model 142 with a different training set and/or adjusts the minimum leaf size ($m_{ls}$), the constant (c), and/or the maximum weight ($w_{max}$).

In some examples, the model builder 306 generates the age correction model 142 to predict the age of the audience member instead of predicting the age category PDF for the audience member (e.g., through regression analysis). In some such examples, the quantity ($n_e$) of the audience member records 202 in Equation 3 above is defined as the quantity of the audience member records 202 within a distance of the target error level ($e_t$) of the true age of the audience member whose weight (w) is being calculated.

While an example manner of implementing the example age modeler 128 of FIG. 1 is illustrated in FIG. 3, one or more of the elements, processes and/or devices illustrated in FIG. 3 may be combined, divided, re-arranged, omitted, eliminated and/or implemented in any other way. Further, the example record generator 302, the example weight calculator 304, the example model builder 306, and/or, more generally, the example age modeler 128 of FIG. 1 may be implemented by hardware, software, firmware and/or any combination of hardware, software and/or firmware. Thus, for example, any of the example record generator 302, the example weight calculator 304, the example model builder 306, and/or, more generally, the example age modeler 128 could be implemented by one or more analog or digital circuit(s), logic circuits, programmable processor(s), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example record generator 302, the example weight calculator 304, and/or the example model builder 306 is/are hereby expressly defined to include a tangible computer readable storage device or storage disk such as a memory, a digital versatile disk (DVD), a compact disk (CD), a Blu-ray disk, etc. storing the software and/or firmware. Further still, the example age modeler 128 of FIG. 1 may include one or more elements, processes and/or devices in addition to, or instead of, those illustrated in FIG. 3, and/or may include more than one of any or all of the illustrated elements, processes and devices.

Figure 4A:
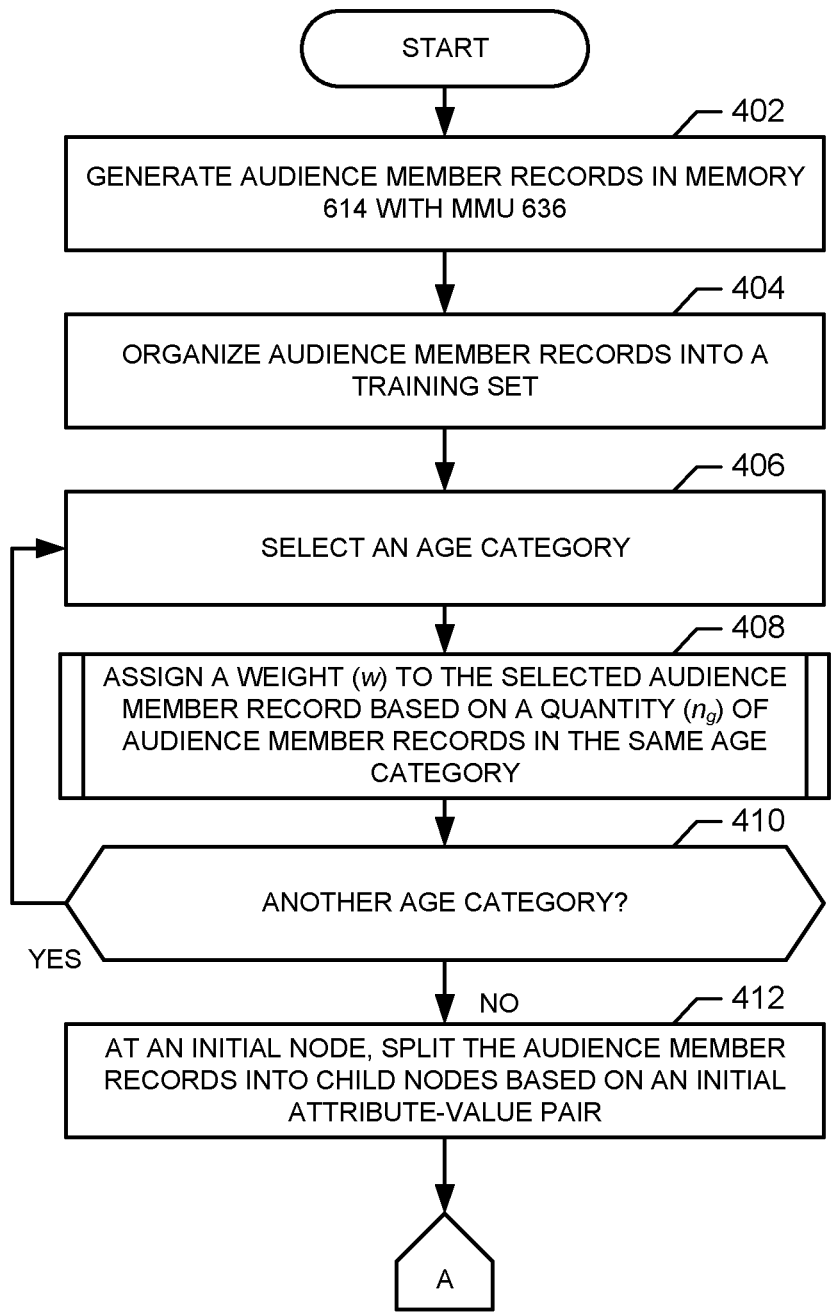
FIGS. 4A and 4B are a flow diagrams of example machine readable instructions that may be executed to implement the example age modeler of FIGS. 1 and/or 3 to generate the age correction model.
Figure 4B:
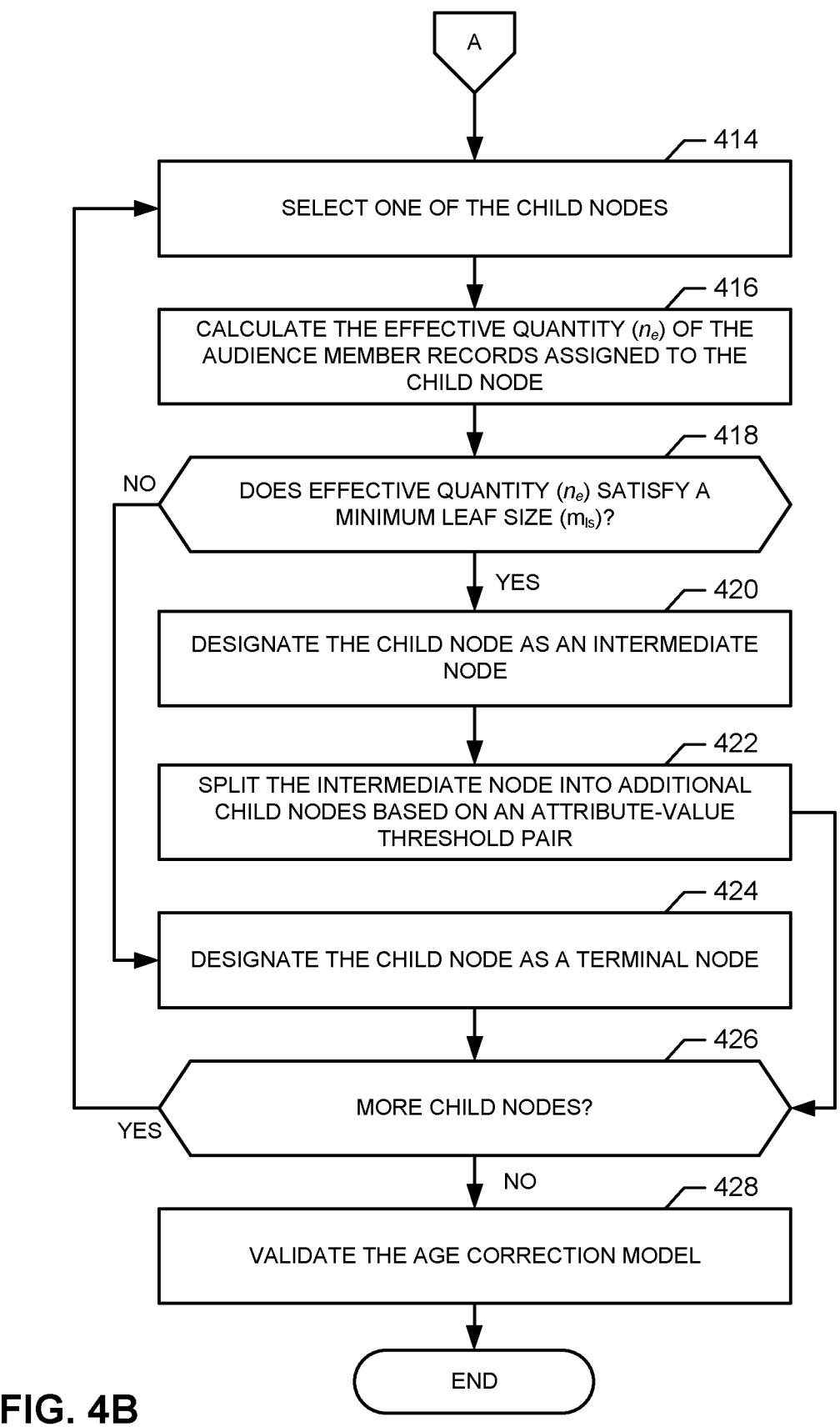
Figure 5:
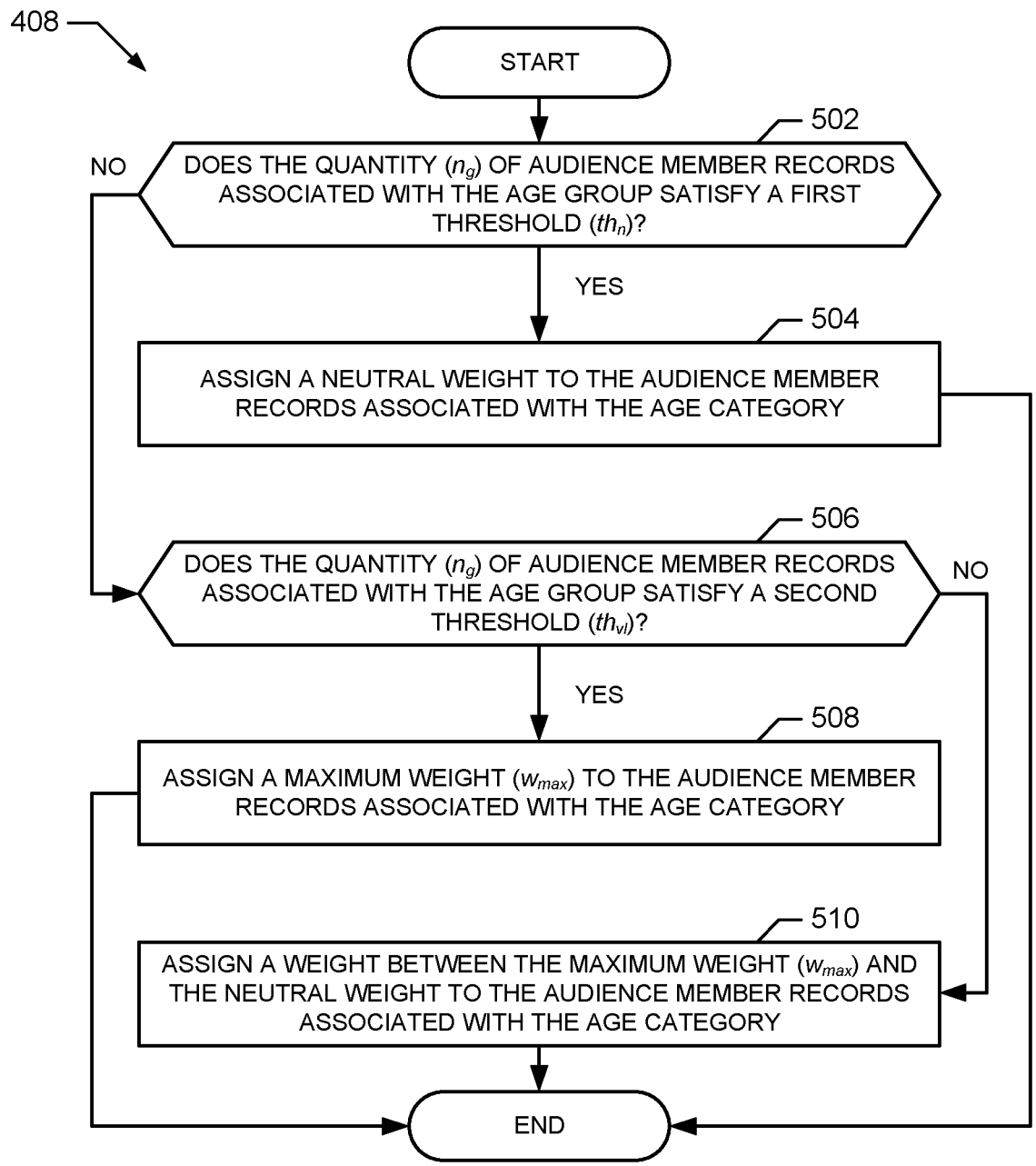
FIG. 5 is a flow diagram of example machine readable instructions that may be executed to implement the example weight calculator of FIG. 3 to assign weights to audience member records.

Flowcharts representative of example machine readable instructions for implementing the age modeler 128 of FIGS. 1 and 3 are shown in FIGS. 4A, 4B, and 5. In this example, the machine readable instructions comprise program(s) for execution by a processor such as the processor 612 shown in the example processor platform 600 discussed below in connection with FIG. 6. The program(s) may be embodied in software stored on a tangible computer readable storage medium such as a CD-ROM, a floppy disk, a hard drive, a digital versatile disk (DVD), a Blu-ray disk, or a memory associated with the processor 612, but the entire program and/or parts thereof could alternatively be executed by a device other than the processor 612 and/or embodied in firmware or dedicated hardware. Further, although the example program(s) is/are described with reference to the flowcharts illustrated in FIGS. 4A, 4B, and 5, many other methods of implementing the example age modeler 128 may alternatively be used. For example, the order of execution of the blocks may be changed, and/or some of the blocks described may be changed, eliminated, or combined.

As mentioned above, the example processes of FIGS. 4A, 4B, and 5 may be implemented using coded instructions (e.g., computer and/or machine readable instructions) stored on a tangible computer readable storage medium such as a hard disk drive, a flash memory, a read-only memory (ROM), a compact disk (CD), a digital versatile disk (DVD), a cache, a random-access memory (RAM) and/or any other storage device or storage disk in which information is stored for any duration (e.g., for extended time periods, permanently, for brief instances, for temporarily buffering, and/or for caching of the information). As used herein, the term tangible computer readable storage medium is expressly defined to include any type of computer readable storage device and/or storage disk and to exclude propagating signals and to exclude transmission media. As used herein, "tangible computer readable storage medium" and "tangible machine readable storage medium" are used interchangeably. Additionally or alternatively, the example processes of FIGS. 4A, 4B, and 5 may be implemented using coded instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media. As used herein, when the phrase "at least" is used as the transition term in a preamble of a claim, it is open-ended in the same manner as the term "comprising" is open ended.

FIGS. 4A and 4B are a flow diagrams of example machine readable instructions that may be executed to implement the example age modeler 128 of FIGS. 1 and/or 3 to generate the age correction model 142 (FIGS. 1 and 3). Initially, the example record generator 302 (FIG. 3) generates audience member records 202 (FIG. 2) based on the detailed demographic information 114 (FIGS. 1 and 3) and database subscriber activity data 134 stored in the panelist database 124 (FIGS. 1 and 3) (block 402). In some examples, the example record generator 302 may execute instructions that cause a memory management unit (e.g., the memory management unit (MMU) 636 of FIG. 6) to load the detailed demographic information 114 and the database subscriber activity data 134 into volatile memory (e.g., the volatile memory 614 of FIG. 6) and to generate the audience member records 202 in the volatile memory 614 by merging portions of the detailed demographic information 114 with the database subscriber activity data 134. The example record generator 302 organizes the audience member records 202 generated at block 402 into a training set and a validation set (block 404). In some examples, the record generator 302 randomly or pseudo-randomly assigns the audience member records 202 to either the training set or the validation set. In some examples, the example record generator 302 may execute instructions that cause the memory management unit 636 to allocate a first block of memory to store the training set and a second block of memory to store the validation set.

The example weight calculator 304 (FIG. 3) selects an age category (block 406). For example, the weight calculator 304 may select the 7-13 age category. In some examples, the weight calculator 304 executes instructions that cause the memory management unit 636 to place into a register (e.g., one of the registers 635 of FIG. 6) the value of a position in an array of memory storing the age categories. The example weight calculator 304 assigns a weight (w) to the audience member records 202 in the age category selected at block 406 based on a quantity ($n_g$) of audience member records 202 in the training set that belong to the same age category (block 408). An example method of assigning the weight (w) to the selected audience member record 202 is disclosed below in relation to FIG. 5. In some examples, the weight calculator 304 executes instructions that cause an arithmetic logic unit (e.g., the arithmetic logic unit (ALU) 634 of FIG. 6) to calculate the weight (w). The example weight calculator 304 determines whether there is another age category to select (block 410). In some examples, the weight calculator 304 executes instructions that cause the memory management unit 636 to determine whether the last position of the memory array storing the age categories has been reached. If there is another age category to select, program control returns to block 406 to select another age category. In some examples, the weight calculator 304 selects the age categories in chronological order. For example, if the first age category selected by the weight calculator 304 was the 7-13 age category, the weight category may select the 14-18 age category. Otherwise, if there is not another age category to select, program control advances to block 412.

At an initial node, the example model builder 306 splits the audience member records 202 in the training set into child nodes based on an initial pair of an attribute 204 (FIG. 2) and a value threshold (block 412). For example, the model builder 306 may select the initial pair of the attribute 204 and the value threshold based on the pair of the attribute 204 and the value threshold that has a maximum entropy value. In some examples, the model builder 306 executes instructions that cause the memory management unit 636 to (i) load the value threshold into a first register (e.g., a register of the registers 635 of FIG. 6) and the values corresponding to the attribute 204 of the audience member records 202 into second registers (e.g., registers of the registers 635 of FIG. 6), and (ii) cause the arithmetic logic unit 634 to compare the value in the first register to the values in the second registers. The example model builder 306 selects one of the child nodes (block 414). In some examples, the model builder 306 executes instructions that cause the memory management unit 636 to load a third block of memory storing the audience member records 202 assigned to the selected child node into cache memory (e.g., the local memory 613 of FIG.

6). For the child node selected at block 414, the example model builder 306 calculates the effective quantity ($n_e$) of the audience member records 202 assigned to the child node (block 416). For example, the model builder 306 may calculate the effective quantity ($n_e$) of the audience member records 202 based on Equation 4 above. In some examples, the model builder 306 executes instructions that cause the arithmetic logic unit 634 to calculate the effective quantity ($n_e$) of the audience member records 202 of from the audience member records 202 loaded into the cache memory 613.

The example model builder 306 determines whether the effective quantity ($n_e$) calculated at block 416 satisfies a minimum leaf size ($m_{ls}$) (block 418). In some examples, the model builder 306 determines that the effective quantity ($n_e$) calculated at block 416 satisfies a minimum leaf size ($m_{ls}$) if Equation 5 above is true. In some examples, the model builder 306 executes instructions that cause the arithmetic logic unit 636 to compare the effective quantity ($n_e$) stored in the first register to the minimum leaf size ($m_{ls}$) stored in the second register. If the effective quantity ($n_e$) calculated at block 416 satisfies the minimum leaf size ($m_{ls}$), the example model builder 306 designates the child node as an intermediate node (block 420). In some examples, the model builder 306 executes instructions that cause the memory management unit 636 to modify a location in the third block of the memory to store a value indicative of being the intermediate node. The example model builder 306 then splits the intermediate node into additional child nodes based on another attribute 204 and a corresponding value threshold (block 422). In some examples, the model builder 306 executes instructions that cause the memory management unit 636 to allocate a block of memory for each of the newly created child nodes. Otherwise, if the effective quantity ($n_e$) calculated at block 416 does not satisfy the minimum leaf size ($m_{ls}$), the example model builder 306 designates the child node as a terminal node (block 424). In some examples, the model builder 306 executes instructions that cause the memory management unit 636 to modify a location in the third block of the memory to store a value indicative of being the terminal node. The model builder 306 determines if there are more child nodes (block 426). In some examples, the model builder 306 executes instructions that cause the arithmetic logic unit 634 to determine if memory blocks associated with the nodes of the age correction model 142 include the value indicative of being the child node. If there are more child nodes, the example model builder 306 selects one of the child nodes (block 414). In some examples, the model builder 306 executes instructions that cause the memory management unit 636 to load a block of memory containing the child node into cache memory 613. Otherwise, if there are no more child nodes, the example model builder 306 validates the age correction model 142 (block 428). In some examples, to validate the age correction model 142, the model builder 306 applies the audience member records 202 in the validation set to the age correction model 142. In some such examples, the model builder 306 compares the expected output of the age correction model 142 (e.g., the age categories indicated by the terminal nodes to which the audience member records 202 are assigned) to the actual output of the age correction model 142 (e.g. the true age associated with the audience member records 202). In some examples, the model builder 306 executes instructions that cause the arithmetic logic unit 634 to calculate differences between registers containing values of the expected output of the age correction model 142 and registers containing values of the actual output of the age correction model 142. The example program of FIGS. 4A and 4B then ends.

FIG. 5 is a flow diagram of example machine readable instructions that may be executed to implement the example weight calculator 304 of FIG. 3 to assign weights to the audience member records 202 (FIG. 2) in the training set. Initially, the example weight calculator 304 determines whether the quantity ($n_g$) of audience member records 202 associated with the selected age category satisfies (e.g., is greater than or equal to) the first weighing threshold ($th_n$) (block 502). If the quantity ($n_g$) of audience member records 202 associated with the selected age category satisfies the first weighing threshold ($th_n$), the example weight calculator 304 assigns a neutral weight (e.g., one, etc.) to the audience member records 202 associated with the age category (block 504).

If the quantity ($n_g$) of audience member records 202 associated with the selected age category does not satisfy the first weighing threshold ($th_n$), the example weight calculator 304 determines whether the quantity ($n_g$) of audience member records 202 associated with the selected age category satisfies (e.g., is less than or equal to) the second weighing threshold ($th_{vl}$) (block 506). If the quantity ($n_g$) of audience member records 202 associated with the selected age category satisfies the second weighing threshold ($th_{vl}$), the example weight calculator 304 assigns the maximum weight ($w_{max}$) to the audience member records 202 associated with the age category (block 508). Otherwise, if the quantity ($n_g$) of audience member records 202 associated with the selected age category does not satisfy the second weighing threshold ($th_{vl}$), the example weight calculator 304 assigns a weight (w) between the maximum weight ($w_{max}$) and the neutral weight to the audience member records 202 associated with the age category (block 510). In some examples, the weight calculator 304 determines the weight (w) to assign to the audience member records 202 associated with the age category based on Equation 3 above. The example program of FIG. 5 then ends.

Figure 6:
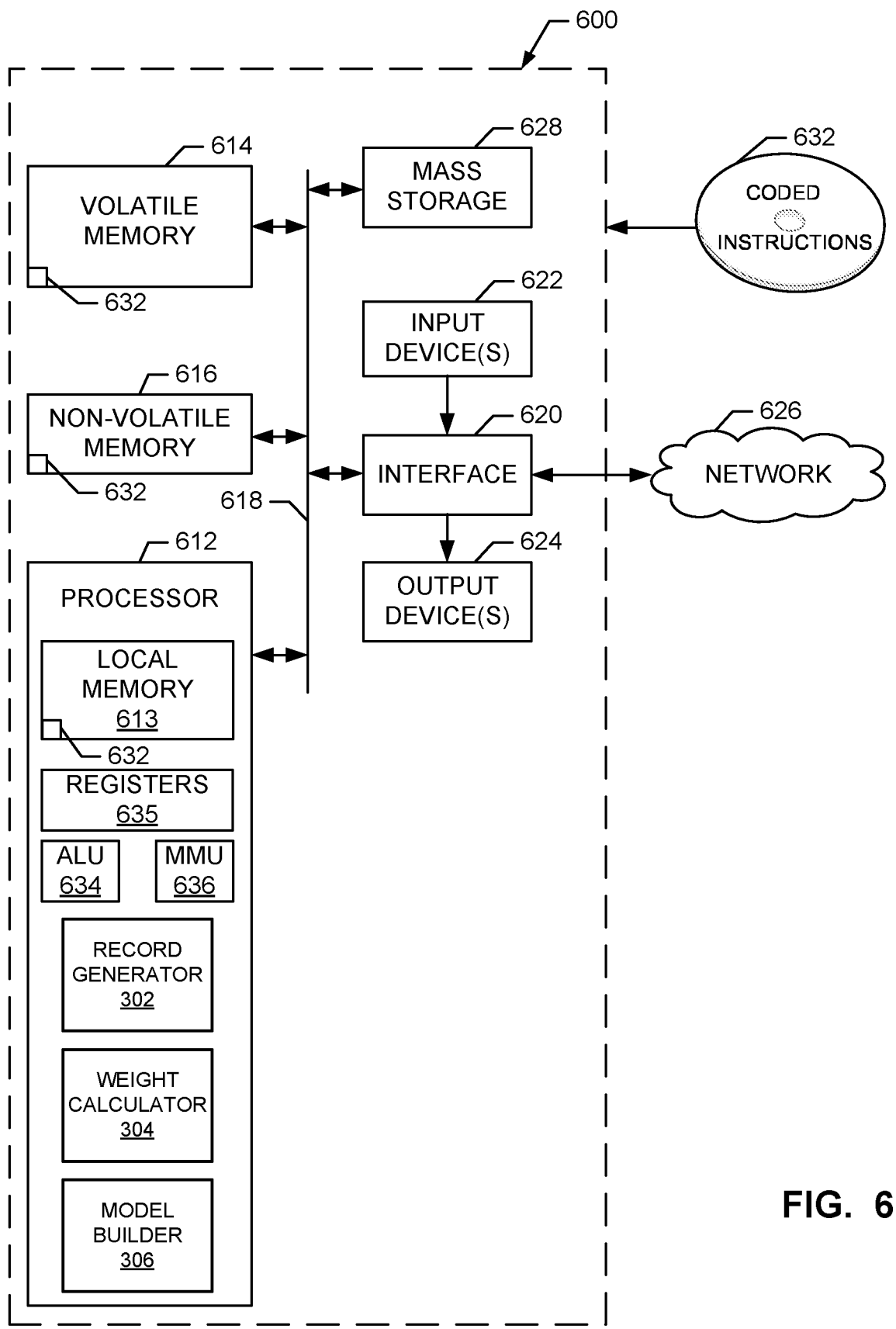
FIG. 6 is a block diagram of an example processor system that may execute any of the machine readable instructions represented by FIGS. 4A, 4B, and/or 5 to implement the apparatus of FIGS. 1 and/or 3.

FIG. 6 is a block diagram of an example processor platform 600 capable of executing the instructions of FIGS. 4A, 4B, and/or 5 to implement the age modeler 128 of FIGS. 1 and 3. The processor platform 600 can be, for example, a server, a personal computer, a workstation, or any other type of computing device.

The processor platform 600 of the illustrated example includes a processor 612. The processor 612 of the illustrated example is hardware. For example, the processor 612 can be implemented by one or more integrated circuits, logic circuits, microprocessors or controllers from any desired family or manufacturer. The example processor 612 includes an arithmetic logic unit 634 to perform arithmetic, logical, and comparative operations on data in registers 635. The example processor also includes a memory management unit 636 to load values between local memory 613 (e.g., a cache) and the registers 635 and to request blocks of memory from a volatile memory 614 and a non-volatile memory 616. The example processor 612 is structured to include the example record generator 302, the example weight calculator 304, and the example model builder 306.

The processor 612 of the illustrated example is in communication with a main memory including the volatile memory 614 and the non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), and/or a PCI express interface.

In the illustrated example, one or more input devices 622 are connected to the interface circuit 620. The input device(s) 622 permit(s) a user to enter data and commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display, a cathode ray tube display (CRT), a touchscreen, a tactile output device, a printer and/or speakers). The interface circuit 620 of the illustrated example, thus, typically includes a graphics driver card, a graphics driver chip or a graphics driver processor.

The interface circuit 620 of the illustrated example also includes a communication device such as a transmitter, a receiver, a transceiver, a modem and/or network interface card to facilitate exchange of data with external machines (e.g., computing devices of any kind) via a network 626 (e.g., an Ethernet connection, a digital subscriber line (DSL), a telephone line, coaxial cable, a cellular telephone system, etc.).

The processor platform 600 of the illustrated example also includes one or more mass storage devices 628 for storing software and/or data. Examples of such mass storage devices 628 include floppy disk drives, hard drive disks, compact disk drives, Blu-ray disk drives, RAID systems, and digital versatile disk (DVD) drives.

Coded instructions 632 of FIGS. 4A, 4B, and 5 may be stored in the mass storage device 628, in the volatile memory 614, in the non-volatile memory 616, and/or on a removable tangible computer readable storage medium such as a CD or DVD.

From the foregoing, it will appreciate that examples disclosed herein allow generation of an age correction model that is representative of audience members in age categories that are underrepresented in a panelist household population. Furthermore, examples disclosed herein allow for generating probability density functions without consuming additional memory and processor resources to infer probabilities reflecting underrepresented ages in the probability density functions. The example probability density functions are based on the audience member records assigned to the respective terminal node that include the underrepresented age(s). This allows the AME, for example, to credit media and/or calculate more accurate ratings that include the ages that are underrepresented in the panelist population without consuming additional memory and processor resources to recruit and monitor panelists the difficult to recruit age categories.

Furthermore, examples disclosed herein solve a problem specifically arising in the realm of computer networks in the Internet age. Namely, as a large variety of media is increasingly accessed via the Internet by more people, the AME cannot rely on traditional techniques (e.g., telephone surveys, panelist logbooks, etc.) to measure audiences of the variety of the media. Additionally, because the database proprietor data used to measure the audiences is self-reported, the database proprietor data may include inaccuracies that cannot be corrected or verified by the AME through the traditional techniques. For example, because the audience member interacts with the database proprietor in a first Internet domain, the AME in a second Internet domain, and the media in a third Internet domain, the AME cannot verify the demographic information (e.g., true age, etc.) of the audience member using the traditional techniques (e.g., a survey, etc.). Examples disclosed herein solve this problem by using demographic information and activity data of known audience members (e.g., the panelists) that interact with the database proprietor in the first Internet domain and the AME in the second Internet domain to correct the demographic information of unknown audience members (e.g., audience members that interact with the database proprietor in the first Internet domain without interacting with the AME in the second Internet domain).

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus, comprising:
    means for managing memory to:
        store audience member records in a first block of the memory, the audience member records including attribute-value pairs representative of database subscriber activity data of corresponding audience members subscribed to a database proprietor;
        split the audience member records from an initial node into child nodes based on comparisons of first ones of the attribute-value pairs of the audience member records to a first value threshold; and
        load, into cache memory of a processor, a portion of the audience member records corresponding to a first one of the child nodes stored in a second block of the memory; and
    means for performing logical operations to compare first and second registers of the processor, the first register including a quantity of ones of the audience member records that are in the first child node, and the second register including a minimum leaf size;
    the means for managing the memory to:
        in response to the quantity of the ones of the audience member records in the first child node not satisfying the minimum leaf size, store a terminal node value in the second block of the memory to indicate the first child node as a terminal node associated with one age category; and
        in response to the quantity of the ones of the audience member records in the first child node satisfying the minimum leaf size, store an intermediate node value in the second block of the memory to indicate the first child node as an intermediate node, and split the first child node into second child nodes to be stored at corresponding third blocks of the memory, the ones of the audience member records in the first child node to be: (1) assigned to corresponding ones of the second child nodes based on comparisons of second ones of the attribute-value pairs of the audience member records to a second value threshold, and (2) processed further to create terminal nodes; and the means for performing the logical operations to generate an age-correction model based on the terminal nodes to facilitate correcting a database subscriber age characteristic associated with a media impression that is logged by a server of the database proprietor based on a network communication transmitted by a client device to report to the server of the database proprietor that media was accessed via the client device.

2. The apparatus of claim 1, wherein the means for managing the memory is to split the audience member records into the child nodes based on comparisons between the first threshold value in a third register and values of the first attribute-value pairs in fourth registers.

3. The apparatus of claim 1, wherein the means for managing the memory is to assign a weight to each audience member record, the weight being based on a quantity of audience members in a same age group as the audience member record.

4. The apparatus of claim 3, wherein the means for managing the memory is to:
store an array of age categories in a fourth block of the memory;
load a fifth register with a value of a position in the array of age categories; and
when the value in the fifth register equals a last position in the array of age categories, determine that all the weights have been assigned.

5. The apparatus of claim 1, wherein the means for managing the memory is to organize the audience member records into a training set and a validation set, the training set to be stored in the first block of the memory and the validation set to be stored in a fourth block of the memory, the means for performing the logical operations to apply the audience member records in the validation set to the age-correction model to validate the age-correction model.

6. The apparatus of claim 5, wherein the means for performing the logical operations is to apply the audience member records in the validation set to the age-correction model by calculating a difference between registers containing values of an expected output of the age-correction model and registers containing values of an actual output of the age-correction model.

7. An apparatus to correct a computer-assigned age characteristic associated with a media impression, the apparatus comprising:
means for managing memory to:
split audience member records in the memory from an initial node into child nodes based on comparisons of attribute-value pairs of the audience member records to a first value threshold, the attribute-value pairs of the audience member records representative of database subscriber activity data of subscribers of a database proprietor; and
designate a first child node of the child nodes as a terminal node when a quantity of the audience member records of the first child node of the child nodes does not satisfy a minimum leaf size; and
means for performing logical operations to:
generate a computer-generated age-correction model based on the terminal node; and
correct, based on the computer-generated age-correction model, the computer-assigned age characteristic associated with the media impression, the media impression indicative of a person exposed to media presented by a media presentation device.

8. The apparatus of claim 7, wherein the means for managing the memory is to assign a weight to the audience member records, the weight based on a quantity of audience members in a same age group as the audience member records.

9. The apparatus of claim 8, wherein the means for managing the memory is to assign the weight to the audience member records corresponding to different age groups by:
assigning, when the quantity of the audience member records grouped in one of the age groups satisfies a first threshold, a neutral weight to the audience member records in the one of the age groups;
assigning, when the quantity of the audience member records grouped in the one of the age groups satisfies a second threshold, a maximum weight to the audience member records in the one of the age groups; and
assigning, when the quantity of the audience member records grouped in the assigning, when the quantity of the audience member records grouped in the one of the age groups satisfies a third threshold, a proportional weight between a neutral weight and a maximum weight to the audience member records in the one of the age groups.

10. The apparatus of claim 7, wherein the means for managing the memory is to generate the audience member records based on survey data obtained from a plurality of panelists, and based on panelist activity data corresponding to the plurality of panelists retrieved from a second database proprietor.

11. The apparatus of claim 7, wherein the means for managing the memory is to load, into cache memory of a processor, a portion of the audience member records corresponding to a first one of the child nodes stored in memory, the means for performing the logical operations to compare first and second registers of the processor, the first register including a quantity of ones of the audience member records that are in the first child node, and the second register including the minimum leaf size.

12. The apparatus of claim 7, wherein the means for managing the memory is to organize the audience member records into a training set and a validation set, the training set to be stored in a first block of the memory and the validation set to be stored in a second block of the memory, the means for performing the logical operations to apply the audience member records in the validation set to the computer-generated age-correction model to validate the computer-generated age-correction model.

13. The apparatus of claim 12, wherein the means for performing the logical operations is to apply the audience member records in the validation set to the computer-generated age-correction model by calculating a difference between registers containing values of an expected output of the computer-generated age-correction model and registers containing values of an actual output of the computer-generated age-correction model.

* * * * *